United States Patent [19]

Stephens et al.

[11] 4,185,895
[45] Jan. 29, 1980

[54] REFLECTIVE MODE, DYNAMIC SCATTERING LIQUID CRYSTAL DISPLAY SYSTEM HAVING A FRESNEL REFLECTOR FOR LIGHTING

[75] Inventors: Craig P. Stephens, Carlsbad; Andrew G. Toth, Ramona, both of Calif.

[73] Assignee: Hughes Aircraft Company, Los Angeles, Calif.

[21] Appl. No.: 891,994

[22] Filed: Mar. 31, 1978

[51] Int. Cl.² .............................................. G02F 1/13
[52] U.S. Cl. .................................. 350/345; 350/338; 350/211; 350/292; 362/346; 40/502
[58] Field of Search ............... 350/338, 345, 211, 292, 350/288, 199; 40/448, 502; 362/346

[56] References Cited

U.S. PATENT DOCUMENTS

| | | | |
|---|---|---|---|
| 3,728,007 | 4/1973 | Myrenne et al. | 350/338 X |
| 3,734,598 | 5/1973 | Aiken | 350/338 |
| 3,920,311 | 11/1975 | Tsuda et al. | 350/345 X |
| 4,124,279 | 11/1978 | Byles | 350/345 |

*Primary Examiner*—Edward S. Bauer
*Attorney, Agent, or Firm*—W. H. MacAllister; Joseph E. Szabo

[57] ABSTRACT

Light is directed at a liquid crystal display with the aid of a Fresnel mirror. With the liquid crystal display upright, the mirror is placed in front of, and slightly below it, so that light from overhead is reflected at the display by the mirror's facets.

16 Claims, 4 Drawing Figures

REFLECTIVE MODE, DYNAMIC SCATTERING LIQUID CRYSTAL DISPLAY SYSTEM HAVING A FRESNEL REFLECTOR FOR LIGHTING

BACKGROUND OF THE INVENTION

The present invention relates generally to externally illuminated display devices and more particularly to such devices of the type wherein information is displayed on a surface which is part of a liquid crystal display.

In contrast to such active display devices as light emitting diodes and cathode ray tubes which generate their own light, liquid crystals displays are passive, generating no light of their own. Information is displayed on liquid crystal displays in the form of images which are of various levels of darkness or apparent reflectivity and are rendered visible by light which impinges on the display surface from an artificial or natural external source.

The particular type of liquid crystal display with which the present invention is concerned is commonly referred to as a reflective mode dynamic scattering liquid crystal display. This type of display must be illuminated from its front and, due to the scattering nature of the activated liquid crystal, the angle of reflection must be close to the viewing angle for adequate brightness to the viewer from the scattering regions. Available arrangements for illuminating an upright reflective mode dynamic scattering liquid crystal display are characterized by conventional projection optics or direct illumination by light sources which extend in front of the display. They tend to obstruct the full field of view, are bulky and have no provision for illuminating the upright display with ambient light.

Accordingly, it is the principal object of the present invention to provide means for directing light at a reflective mode dynamic scattering liquid crystal display which lends itself to operation both with an ambient and an artificial light source.

A related object of the invention is to provide such a means which is compact, inexpensive and does not interfere with the field of view.

These and other objects of the invention are accomplished by a display apparatus having an upright, reflective mode dynamic scattering liquid crystal display and illuminated from an overhead source, wherein a Fresnel reflector is mounted in front and below the display and extends laterally therefrom. The reflector is provided with a plurality of facets disposed in a plurality of planes, each of them disposed at an acute included angle with the display surface of the liquid crystal display, so that light from the overhead source impinging on the reflector is reflected thereby at the display surface. The foregoing arrangement is readily adaptable for directing light at a desired angle at the liquid crystal display either from an artificial light source mounted directly above the reflector, or from ambient light impinging from above onto the reflector. The facets of the reflector may be either parallel, so that light from above is reflected in parallel rays at the display, or they may be disposed at progressively diminishing included angles with the surface of the display at progressively greater distance away therefrom, so as to cause light projected at the display to converge at a focal point which is behind the display surface.

BRIEF DESCRIPTION OF THE DRAWINGS

The novel features of this invention as well as the invention itself will be best understood from the accompanying description taken in conjuction with the accompanying drawings wherein like characters refer to like parts and in which.

DETAILED DESCRIPTION OF THE PREFERRED EMBODIMENTS

Figure 1:
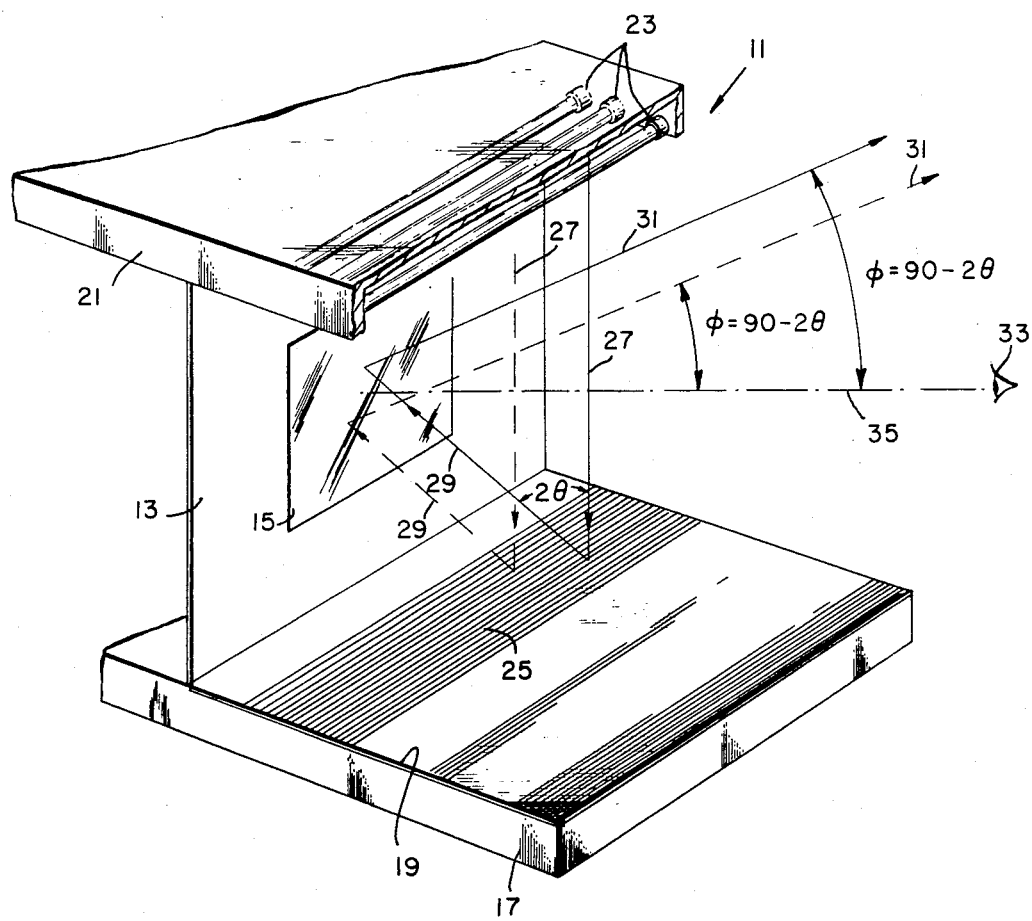
FIG. 1 is a perspective view of a display system incorporating one version of the invention wherein impinging light is reflected onto a liquid crystal display by means of a Fresnel reflector having parallel facets.

As shown in FIG. 1, a display system 11 incorporating one embodiment of the present invention includes a liquid crystal display 13 having a display surface 15 and mounted upon a base 17. Extending along the surface of, and supported by, the base 17 is a Fresnel reflector 19 having a plurality of reflective facets 25 (see FIG. 2). Beams 27 of light from an overhead source are redirected by the Fresnel reflector 19 at the display surface 15, the second leg of their path being illustrated by lines 29. The incident light beams 29 are reflected by the display surface 15, emerging therefrom as the beams of light 31.

An optional canopy 21, housing a plurality of light sources 23, extends above the display 13 and over the base 17. In order not to block available or ambient light from above, the canopy 21 should be transparent and the light sources 23, typically lamps, should be spaced far enough apart to allow light to penetrate between them. Both in FIGS. 1 and 2, the viewer is represented by the eye symbol 33, and the line of sight from the eye 33 to the display surface 15 is indicated by the dashed line 35.

It is important with liquid crystal displays of the type being considered here, that the included angle $\phi$ between the line of sight 35 and the light beams 31 leaving the display surface 15 be within prescribed limits. It is a feature of the present invention that, with the Fresnel reflector, this angle can be selected to fall within the range desired. More particularly, reflective mode dynamic scattering liquid crystal displays have two principal applications. They may be used to display alphanumeric characters. In that application, it has been found that maximum contrast is obtained when the included angle $\phi$ between the line of viewing 35 and light 31 which has been reflected by the display surface 15 is 15°. It has been also found that a reasonable range for the angle $\phi$ is 10° to 20°. A second principal application of the display under consideration is in handling video information. In such applications, it is important that the display have a grey scale capability and this can be accomplished by imparting to the display the characteristic whereby its contrast ratio changes approximately linearly with the voltage across the display. This characteristic, in turn, has been found to be optimized when the included angle $\phi$ between the line of viewing 35 and the line of departing light 31 is 30°. The reasonably effective range for the included angle $\phi$ for this type of operation is believed to extend between 20° and 40°.

Figure 2:
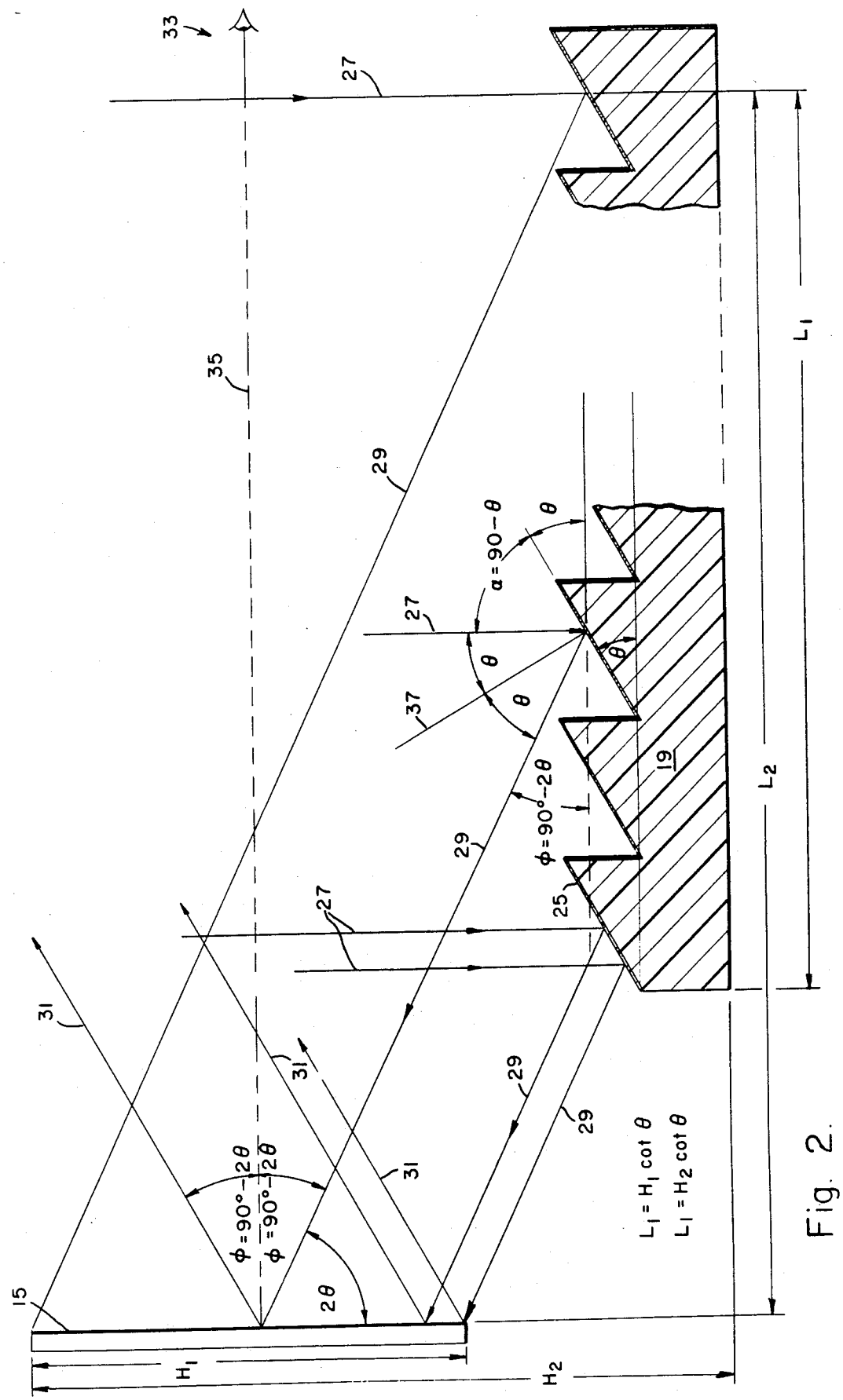
FIG. 2 is an enlarged cross-section taken through the system of FIG. 1 in order to illustrate the angles of incidence and reflection of light entering the display system.

FIG. 2 illustrates the relationships between the various important angles found in the exemplary display system 11. Disposed in a plurality of parallel planes are the reflective facets 25 of the Fresnel reflector 19. Lines 37, used to illustrate these relationships, intersect each of the facets 25 at right angles. With beams of light 27 impinging upon the reflective facets 25 directly from above, the angle of incidence $\phi$ between lines 27 and 37 will equal the angle of reflection, that is, the angle between the normals 37 and the beams of light 29 leaving the facets 25 and impinging on the display surface 15. With the display surface 15 being vertical, and therefore parallel to the impinging beams of light 27, it can be seen that the beams of light 27 impinging on the display 15 from the Fresnel reflector 19 reach the display surface at an angle $2\theta$ with that surface. It may also be seen that $\phi = 90° - 2\theta$. Finally, it may be seen from elementary principles of geometry that $\alpha = 90 - \theta$, where $\alpha$ is the included angle between the plane in which the display surface 15 lies and the planes in which the reflective facets 25 lie. Using these relationships, it can easily be shown that the desired optimum value of $\theta = 15°$ for an alpha-numeric display is attained when $\alpha = 52.5°$ and that the optimum value of $\phi = 30°$ is attained when $\alpha = 60°$. Similarly, the desired range of $\phi = 10°$ to 20° is attained when $\alpha = 50°$ to 55° and the desired range $\phi = 20°$ to 40° is attained when $\alpha = 55°$ to 65°. It follows from the above that $\alpha = 50°$ to 65° represents the most useful range for both types of displays.

The following relationships define the desired size and location of a given Fresnel reflector of the type illustrated in FIG. 2 for a display surface 15 which is disposed in front of a Fresnel reflector and above it:

$$L_1 = H_1 \cot \theta$$

$$L_2 = H_2 \cot \theta$$

where
$L_1$ = length of the Fresnel reflector
$L_2$ = distance from base of display to end of reflector
$H_1$ = vertical dimension of display surface
$H_2$ = height of top of display surface above reflector It is apparent that, if the reflector 19 extends nearer to the display surface 15 than required, incident light reflected by the reflector will pass uselessly below the display surface. Similarly, if the reflector 19 extends beyond the maximum distance defined by $L_2$, light beams reflected by the facets 25 which so extend will pass uselessly above the display surface 15.

It is also apparent that the reflector 19 is particularly advantageous for providing the type of illumination required for reflective mode dynamic scattering liquid crystal displays. It lies flat, out of the line of vision 35, and its characteristic angles $\theta$ and $\phi$ can be varied by the proper selection of the Fresnel reflector facet angle $\alpha$. Another advantage of the Fresnel reflector illustrated in FIG. 2 is that it can be readily fabricated by applying a reflective coating to the facets of a Fresnel prism, a commonly obtainable optical element having the geometric configuration illustrated for the reflector 19 except for the fact that its facets are light transmissive.

Figure 3:
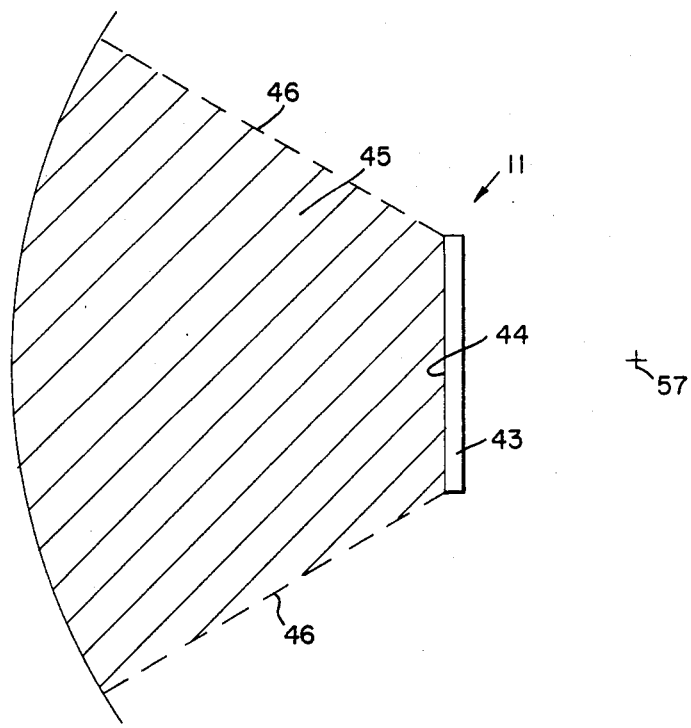
FIG. 3 is a plan view of a display system incorporating a second embodiment of the invention, wherein incident light is reflected onto a liquid crystal display by means of a Fresnel reflector having a plurality of arcuate reflective facets whose included angles with the surface of the display get progressively smaller at increasing distances from the display surface.
Figure 4:
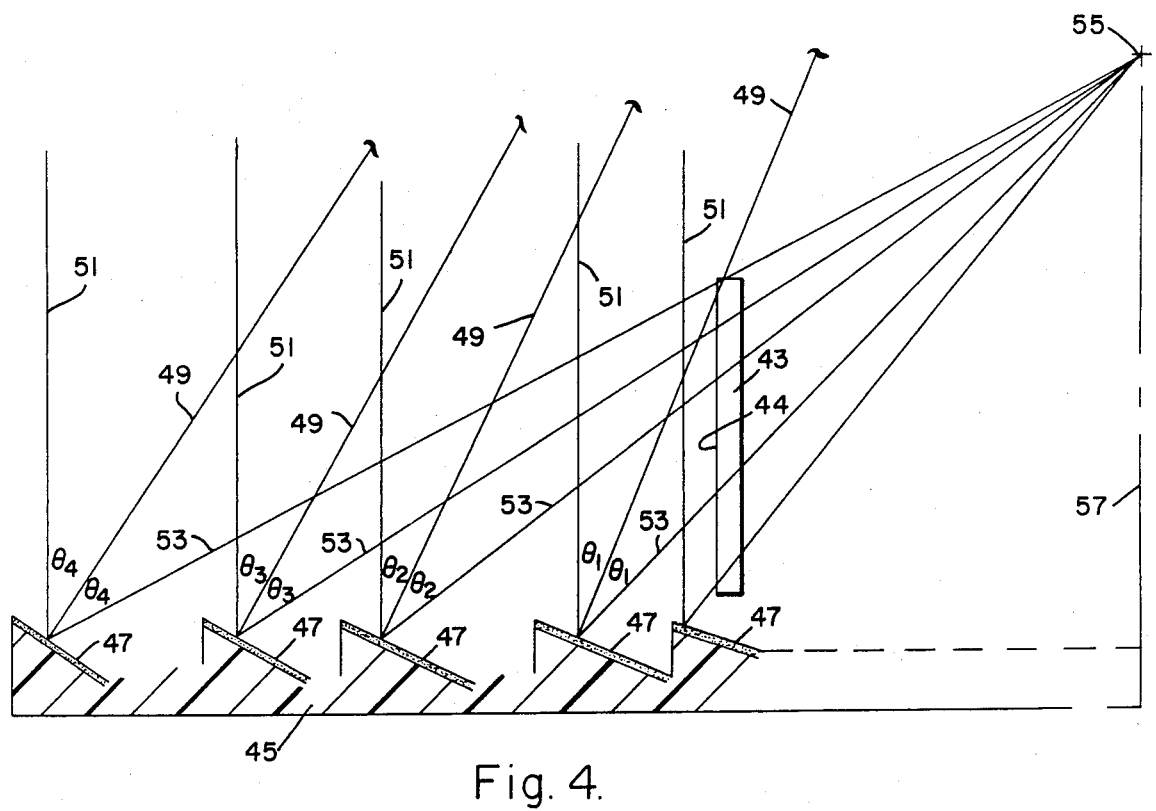
FIG. 4 is an enlarged cross-section of the display system illustrated in FIG. 3 in order to illustrate in greater detail the path of light entering the display system and reflected onto the display surface by means of the Fresnel reflector.

The second embodiment of the present invention is illustrated in FIGS. 3 and 4. It includes a liquid crystal display 43 of the same type as was represented by the element 15 in FIG. 2. Disposed in front of, and just below, the display 43 is a Fresnel reflector 45 having a plurality of reflective facets 47. The Fresnel reflector 45 of FIGS. 3 and 4 is optically different from its counterpart, the element 19 illustrated in FIGS. 1 and 2. This is best seen by the lines 49 in FIG. 4 which are normal to respective ones of the reflective facets 47. The Fresnel reflector 45 is obtained by applying a reflective coating to the surface of a Fresnel lens in contrast to the Fresnel reflector of FIGS. 1 and 2 which is obtained by applying such a coating to a Fresnel prism. In contrast to the facets of the Fresnel reflector 19, which lie in parallel planes, the facets 47 of the Fresnel reflector 45 do not. Rather, the Fresnel lens from which the Fresnel reflector 45 is formed comprises a plurality of concentric grooves, each of which defines one of the facets 47. Their common center defines the center lines of the Fresnel lens and hence of the Fresnel reflector 45.

An important characteristic of the Fresnel lens, and hence of the Fresnel reflector 45, is that the lines 49, which lie normally to its respective facets of 47, converge at a common point which is the radius of curvature of the lens, a point which lies beyond the borders of FIG. 4. Assuming that the display surface 44 is vertical, that the Fresnel reflector 45 is horizontal, and that beams of collimated light 51 impinge vertically from overhead, it will be apparent that the included angles $\theta_1$, $\theta_2$, $\theta_3$, and $\theta_4$ between those impinging beams of light 51 and respective ones of the normals 49 are progressively greater with facets 47 at progressively greater distances from the center line of the Fresnel reflector 45. The same is also true of the included angles $\theta_1$ through $\theta_4$ between the Fresnel-reflected light beams 53 and the normals 49, causing those reflected light beams 53 to converge at the focal point 55 lying on the center line 57 of the reflector, thereby maximizing the amount of Fresnel-reflected light 53 collected by the display surface 44.

The display 43 is placed just above the reflector 45 and away from its center line 57. The position of the display surface 44 relative to the Fresnel reflector 45 may be determined empirically in the following manner. First, the focal length of the Fresnel reflector 45 is determined experimentally by directing collimated light onto it and observing where the rays converge.

The display is then positioned so as to be covered by reflected light, again using collimated light directed perpendicularly to the reflector plane. The portion of the lens to be used can be determined by a scaled sketch such as FIG. 4. The positioning is empirical and depends on the diameter of the lens from which the reflector is derived, its focal length, the display height, the distance the reflector can extend beyond the display, and the maximum angle of light rays striking the display providing illumination to the viewer. The following are approximate recommended dimensions relative to the display height, D:

Extension of reflector in front of display (Depends heavily on size of display base available): 2D Lens diameter: 6D
Focal length: 2D A focal length closer to 1D provides a shallower angle and decreases the distance from the reflector to the display; however, allowance must be made for the display frame.

The advantage of a reflector of the type shown in FIGS. 3 and 4 over the type of reflector illustrated in FIGS. 1 and 2 is that the former permits the use of a larger reflector. It will be recalled that the reflector 19 of FIGS. 1 and 2 is limited in size by its geometry, since light reflected by it would either pass uselessly below the display or above it, if the reflector were larger than the maximum dimension dictated by the vertical dimension of the display surface 15. This limitation does not exist with the reflector of 45, because, no matter how near its front edge reaches toward the display surface 44 and no matter how far its rear edge extends away from that display surface, the light beams reflected by all of its facets 47 will continue to be directed toward the focal point 55 of the lens and hence will fall upon the display surface 44, provided that it is properly placed in relation to the reflector. Naturally, there will be a point of diminishing returns where the reflector becomes so large that light reflected from its outermost facets becomes attenuated by the time they reach the display surface 44, so that the benefit gained does not justify the added cost and size. Long before this point is reached, however, the total reflected light which can be directed by the Fresnel reflector 45 onto the display surface 44 will exceed that which is attainable by the Fresnel reflector 19 of FIG. 2 for a display surface of the same size.

Another reason why the Fresnel reflector 45 of FIGS. 3 and 4 permits more light to be projected onto a display of a given size than its counterpart 19 in FIGS. 1 and 2 may be seen by comparing FIGS. 1 and 3. The Fresnel reflector 19 having parallel facets, all of which lie in flat planes, is limited in width to the width of the display surface 15. Increasing the width of the Fresnel reflector 19 beyond the width of the display surface 15 illuminated by it will not substantially increase the amount of light that can be redirected from an overhead source by the reflector 19 onto the display surface 15. The contrary is true of the reflector 45 of FIG. 3. Because its facets are defined by concentric grooves, the grooves themselves are arcuate, so that the light from an overhead source will be reflected onto the display surface 44 even if it impinges upon one of the reflective facets 47 lying beyond the area of the reflector 45 directly in front of the display surface 44. Obviously, there is a limit to the maximum useful arcuate extent of the reflector 45, this being illustrated by the dashed borders 46 thereof in FIG. 3. Any increase in the amount of light that can be collected by the reflector 45 as a result of moving the borders 46 of the reflector so as to enlarge it, will be increasingly marginal and will diminish to zero when the borders 46 become aligned with the plane of the display surface 44. How far one approaches that point is a matter of choice, representing a trade-off between a maximum desired width for the display system and the minimum amount of illumination desired for the display surface 44.

In a manner similar to the fabrication of Fresnel reflector 19 of FIGS. 1 and 2, the reflector 45 of FIGS. 3 and 4 can be fabricated from readily available optical elements. In particular, the reflector can be obtained by applying a reflective coating to the grooved side of a negative Fresnel lens which is available in various sizes and focal points from a number of optical supply houses. A single such coated Fresnel lens can provide up to four fan-shaped reflectors, such as that illustrated in FIG. 3.

What is claimed is:

1. A display system comprising in combination:
   (a) a base having a support surface extending in a first plane;
   (b) a reflective mode, dynamic scattering, liquid crystal display mounted on said base and extending in a second plane transversely to said support surface;
   (c) a Fresnel reflector mounted on said support surface in front of said liquid crystal display and extending transversely therefrom, said reflector having a plurality of reflective facets disposed in a plurality of planes, each plane disposed at an acute included angle with the second plane of said liquid crystal display.

2. The display system of claim 1 characterized further in that said plurality of facets are disposed in a succession of parallel planes disposed at a common included angle with the second plane of said liquid crystal display.

3. The display system of claim 2 characterized further in that said common included angle is between 50° and 65° inclusive.

4. The display system of claim 3 characterized further by a light source fixed relative to said base in front of said liquid crystal display and above said Fresnel reflector, so that light from said source is reflected from the facets of said reflector obliquely at said liquid crystal display.

5. The display system of claim 3 characterized further in that said liquid crystal display is two-toned, and said common included angle is between 50° and 55° inclusive.

6. The display system of claim 3 characterized further in that said liquid crystal display has gray shade capability and said common included angle is between 55° and 65° inclusive.

7. The display system of claim 1 characterized further in that said plurality of facets are formed by a succession of concentric grooves and in that the planes in which successive ones of said facets lie form progressively smaller included angles with the second plane of said display at progressively greater distances from said display.

8. The display system of claim 7 characterized further in that said Fresnel reflector has a focal point which lies behind and above the display surface of said liquid crystal display.

9. In a display system having an upright reflective mode dynamic scattering liquid crystal display illuminated by an overhead light source, the improvement comprising:
   a Fresnel reflector mounted in front of and below said liquid crystal display and extending laterally therefrom, said reflector having a plurality of facets disposed in a plurality of planes, each plane disposed at an acute included angle with the display surface of said liquid crystal display, so that light from said overhead source impinging on said lens is reflected thereby at said display surface.

10. The display system of claim 9 characterized further in that said plurality of facets are disposed in a succession of parallel planes disposed at a common included angle with the display surface of said liquid crystal display.

11. The display system of claim 10 characterized further in that said common included angle is between 50° and 65° inclusive.

12. The display system of claim 10 characterized further by a light source fixed relative to said base in front of said liquid crystal display and above said Fresnel reflector so that light from said source is reflected from the facets of said lens obliquely at said liquid crystal display surface.

13. The display system of claim 11 characterized further in that said liquid crystal display is two-toned and said common included angle is between 50° and 55° inclusive.

14. The display system of claim 11 characterized further in that said liquid crystal display has gray shade capability and said common included angle is between 55° and 65° inclusive.

15. The display system of claim 9 characterized further in that said plurality of facets are formed by a succession of concentric grooves and in that the planes in which successive ones of said facets lie form progressively smaller included angles with the second plane of said display at progressively greater distances from said display.

16. The display system of claim 15 characterized further in that said Fresnel reflector has a focal point which lies behind and above the display surface of said liquid crystal display.

* * * * *